(12) United States Patent
Hafstad et al.

(10) Patent No.: US 12,634,579 B2
(45) Date of Patent: *May 19, 2026

(54) AUTONOMOUS VIDEO CONFERENCING SYSTEM WITH VIRTUAL DIRECTOR ASSISTANCE

(71) Applicant: HUDDLY AS, Oslo (NO)

(72) Inventors: Jon Tore Hafstad, Oslo (NO); Aida C. Lopez, Oslo (NO); Elena You, Oslo (NO); Kai Alexander Wig, Oslo (NO); Lars Erling Stensen, Oslo (NO); Mona Kleven Lauritzen, Oslo (NO); Stian Selbek, Koppang (NO); Tamás Becsei, Oslo (NO); Niklas Schmidt, Oslo (NO); Therese Byhring, Oslo (NO); Vebjørn Boge Nilssen, Oslo (NO); Patrik Kvarme Hansen, Oslo (NO); Knut Helge Teppan, Asker (NO); Stein Ove Erikson, Oslo (NO); Vegard Hammer, Tåmåsen (NO); Bendik Kvamstad, Oslo (NO); Jan Tore Korneliussen, Oslo (NO); Håvard Pederson Alstad, Oslo (NO); Oleg Jakobsen, Vinterbro (NO)

(73) Assignee: HUDDLY AS, Oslo (NO)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,039

(22) Filed: Sep. 8, 2023

(65) Prior Publication Data

US 2023/0421899 A1      Dec. 28, 2023

Related U.S. Application Data

(63) Continuation of application No. 17/678,954, filed on Feb. 23, 2022, now Pat. No. 12,041,347.

(51) Int. Cl.
H04N 23/67       (2023.01)
G06N 3/04        (2023.01)
H04N 7/15        (2006.01)

(52) U.S. Cl.
CPC ............... H04N 23/67 (2023.01); G06N 3/04 (2013.01); H04N 7/15 (2013.01)

(58) Field of Classification Search
CPC ...... H04N 23/67; H04N 23/90; H04N 23/662; H04N 7/15; H04N 7/147; H04N 7/152;
(Continued)

(56) References Cited

U.S. PATENT DOCUMENTS 9,270,941 B1 * 2/2016 Lavelle ................ H04N 23/695
10,659,731 B2 * 5/2020 Harrison ................ G06T 7/246
(Continued)

FOREIGN PATENT DOCUMENTS

WO      WO 2020208038         10/2020
WO      WO-2020208038 A1 * 10/2020 ........... G06F 18/214

OTHER PUBLICATIONS

International Search Report and Written Opinion in PCT Application No. PCT/US2022/025427 dated Jun. 29, 2022 (25 pages).
(Continued)

*Primary Examiner* — Trang U Tran
(74) *Attorney, Agent, or Firm* — FINNEGAN, HENDERSON, FARABOW, GARRETT & DUNNER LLP

(57) ABSTRACT

Systems and methods are provided to power video conferencing and remote collaboration with subsymbolic and symbolic artificial intelligence. The autonomous video conferencing systems of this disclosure include one main smart camera and multiple peripheral smart cameras, optionally coupled with one or more smart sensors. Each smart camera is equipped with a vision pipeline supported by machine learning to detect objects and their interactions as well as related changes in gesture and posture, and a virtual director adapted to apply a predetermined rule set consistent with television studio production principles. The main camera is adapted to select and update a focus video stream in real time under the direction of its virtual director and stream the updated focus stream to a user computer. Methods for creating an automated television studio production for a variety of conferencing spaces and special-purpose scenarios with virtual director assistance are provided.

31 Claims, 8 Drawing Sheets

(58) Field of Classification Search
CPC ...... G06N 3/04; G06N 3/0464; G06N 3/0475;
G06N 3/0495; G06N 3/0499
USPC ................................................. 348/204, 349
See application file for complete search history.

(56) References Cited

U.S. PATENT DOCUMENTS

| | | | |
|---|---|---|---|
| 2006/0005136 A1* | 1/2006 | Wallick ................. | H04M 9/082 |
| | | | 715/726 |
| 2007/0279494 A1* | 12/2007 | Aman .................... | H04N 5/278 |
| | | | 348/169 |
| 2018/0167584 A1* | 6/2018 | Nimri .................. | H04N 23/698 |
| 2019/0313058 A1* | 10/2019 | Harrison ................. | G06T 7/194 |
| 2020/0267427 A1 | 8/2020 | Rogers et al. | |
| 2021/0019982 A1* | 1/2021 | Todd .................. | H04N 21/2343 |

OTHER PUBLICATIONS

Afshari et al., "Short Paper: The Smart Conference Room: An
Integrated System Tested for Efficient, Occupancy-Aware Lighting
Control," ACM, Nov. 5, 2015, retrieved on [Sep. 6, 2022]. Retrieved
from the Internet <URL: https://dl.acm.org/doi/pdf/10.1145/2821650.
2821675> entire document.
Extended European Search Report dated Apr. 11, 2025, for corre-
sponding European Patent Application No. 22930097.5 (10 pgs).

\* cited by examiner

801

802

AUTONOMOUS VIDEO CONFERENCING SYSTEM WITH VIRTUAL DIRECTOR ASSISTANCE

CROSS-REFERENCE TO RELATED PATENT APPLICATIONS

This application is a Continuation of U.S. application Ser. No. 17/678,954, filed on Feb. 23, 2022, the contents of which are incorporated herein by reference.

BACKGROUND OF THE DISCLOSURE

The present disclosure relates in general to video conferencing and remote collaboration technologies. Specifically, the present disclosure relates to powering video conferencing and remote collaboration with smart cameras and smart sensors using artificial intelligence. More specifically, the present disclosure relates to autonomous video conferencing systems with virtual director assistance and methods for creating an automated television studio production for a video conferencing space with virtual director assistance.

Remote collaboration and video conferencing has become a mainstay in the modern business world and societies at large. In traditional video conferencing, the experience for the participants is largely static. Cameras in meeting rooms are generally oblivious of social or space cues, such as speaker-listener dynamics, participants' reactions, body language, direction of attention, and extent of engagement. As a remote participant, therefore, the experience often lacks engagement. Existing hardware and software video conferencing solutions generally rely on a single camera system. Such a system is limited generally to displaying objects in the video conferencing space from one direction or one angle. It is thus challenging for the system to capture facial expressions and subtle changes in gesture and posture among objects variously located in the video conferencing space. As a result, remote participants are presented with a sub-optimal and less engaging experience. In a large video conferencing space, often it may be difficult additionally to capture and frame an object located far away from the camera, and thus difficult if not impossible for remote participants to see or read the object and engage with them.

More recent remote collaboration and video conferencing solutions have seen improvements that enable a remote user to adjust settings for their screen selection, image filtering, recording, ambient audio control, file sharing, and privacy control preferences among other things. However, the lack of ability for a remote user to see or read the room and engage fully in real time with all objects in a conferencing space remains a drawback. Due to these limitations, therefore, despite the exponential growth of video conferencing solutions in recent years, in-person meetings are still favored in a variety of contexts if a user is unable or unwilling to compromise their ability to actively engage in a particular meeting or conference program.

There is therefore a need for smart video conferencing solutions capable of capturing and detecting all objects and their interactions as well as related changes in gesture and posture in the entire conferencing space. More specifically, there is a need to create a cohesive video conferencing production that resembles a television studio production for the entire video conference in real time and stream such production to a remote user thereby improving engagement of the remote user.

SUMMARY OF THE VARIOUS EMBODIMENTS

It is therefore an object of this disclosure to power video conferencing solutions with subsymbolic artificial intelligence thereby enabling the detection of objects and their interactions as well as related changes in gesture and posture. It is a further object of this disclosure to develop a rule set conforming to television production principles using symbolic artificial intelligence and create an automated video conferencing production for streaming to remote users in real time by applying such rule set.

Particularly, in accordance with this disclosure, there is provided, in one embodiment, an autonomous video conferencing system comprising a plurality of smart cameras. Each of the plurality comprises an image sensor adapted to capture video images in a video conferencing space and output an overview video stream and a focus video stream, wherein the focus video stream comprises sub-video images framing detected objects within the overview video stream; an audio device adapted to capture audio signals in the video conferencing space; a vision pipeline unit adapted to receive said overview video stream and said audio signal, and detect objects and postures by means of machine learning, wherein the objects comprises persons and non-person items and said postures comprises positions, orientations, gestures, and directions of detected objects; a virtual director unit connected to the vision pipeline unit and the audio device and adapted to frame objects of interest according to a predetermined rule set thereby allowing the focus video stream to be updated in real time, wherein said predetermined rule set is adapted to create an automated television studio production from the video conferencing space; a stream selector connected to the virtual director unit and adapted to transition the focus video stream to an updated focus video stream; and an application programming interface connected to the virtual director unit and adapted to provide at least one connection to another smart camera in the plurality and one connection to a user computer.

According to one embodiment, one of the plurality of smart cameras is adapted as a main camera and each of the remaining of the plurality is adapted as a peripheral camera. The application programming interface of each peripheral camera is connected to the application programming interface of the main camera. The stream selector of each peripheral camera is further adapted to transmit its updated focus stream to the stream selector of the main camera, and the stream selector of the main camera is further adapted to select one of the updated focus streams from the plurality of smart cameras as an updated main focus stream and output the updated main focus stream to a user computer.

In another embodiment, the autonomous video conferencing system further comprises a plurality of smart sensors placed in the video conferencing space and adapted to capture non-image signals in the video conferencing space. Each of the plurality of smart sensors comprises an application program interface that is adapted to connect to the application program interface of the main camera. thereby providing input to the virtual director unit of the main camera.

In yet another embodiment, each of the plurality of smart sensors is selected from the group consisting of a touchpad, a microphone, a smartphone, a GPS tracker, an echolocation sensor, a thermometer, a humidity sensor, and a biometric sensor.

In a further embodiment, the audio device comprises an array of microphones adapted to provide direction of audio with the captured audio signals.

In another embodiment, the vision pipeline unit comprises at least one hardware accelerated convolutional neural network. In yet another embodiment, the vision pipeline unit is pre-trained with a training set of video and audio data adapted to a special-purpose video conferencing space. In a further embodiment, the special-purpose video conferencing space is selected from the group consisting of a classroom, a workshop, a townhall, a newsroom, a boardroom, a courtroom, an interview studio, and a voting chamber.

In another embodiment, the predetermined rule set comprises a first rule for evaluating possible framing for each object in the video conferencing space based on a first plurality of parameters thereby determining the best frame. In yet another embodiment, the first plurality of parameters comprises: (i) whether the object is speaking; (ii) the length of speaking time; (iii) the direction of the object's gaze; (iv) the extent of the object's visibility in the frame; (v) the posture of the object; and (vi) what other objects are visible in the frame.

In a further embodiment, the predetermined rule set further comprises a second rule for detecting changes in the video conferencing space based on a second plurality of parameters to trigger transition of frames. In another embodiment, the second plurality of parameters comprises: (i) an object starts to speak; (ii) an object moves; (iii) an object stands up; (iv) the direction of an object's gaze changes; (v) an object shows a reaction; (vi) an object displays a new item in the scene; (vii) an object has spoken for a predefined length of time; and (viii) lack of meaningful reactions in other objects for a predefined length of time.

In yet another embodiment, the predetermined rule set further comprises a third rule for applying suitable shot types to each frame based on a third plurality of parameters consistent with television studio production principles. In a further embodiment, the third plurality of parameters comprises: (i) a total shot to frame substantially all objects and most of the video conferencing space thereby providing an overall context to the video conferencing space; (ii) a medium shot to frame a predefined number of objects and focus on one who is speaking, thereby featuring an active dialog; and (iii) a close shot to frame one object speaking for a predefined length of time, thereby featuring a presenter.

In another embodiment, the third plurality of parameters further comprises (i) an interest shot to frame an object of interest based on cues of the scene in the video conferencing space, including an object at the center of the gaze from every object within the video conferencing space and an item held up by an object; (ii) a listening shot to frame at least one object who is not speaking, thereby featuring engagement of non-speaking objects in the video conferencing space; and (ii) a presenter shot to frame an object who has been speaking for a predefined longer length of time compared to other objects, thereby featuring the presenter from different camera angles and compositions within the video conferencing space. According to various embodiments, the interest shot is adapted as a close shot, the listening shot is adapted as one of a close and medium shot, and the presenter shot is adapted as one of a close and medium shot.

In another embodiment, the predetermined rule set further comprises a fourth rule for applying virtual Director's Cut based on a fourth plurality of parameters to the video conferencing space thereby tailoring it to special-purpose television production scenarios. In yet another embodiment, the fourth plurality of parameters comprises: (i) a classroom production scenario starting with showing a presenter and an audience using total shots, then transitioning to framing the presenter in presenter shots for a predefined length of time, followed by switching between listening shots showing the audience and presenter shots showing the presenter; (ii) a workshop production scenario starting with showing all participating objects using total shots, then transitioning to showing an active object using medium shots, followed by showing an object moving in the video conferencing space using medium shots, and rotating back after a predefined length of time to showing active objects within the video conferencing space; and (iii) a meeting room production scenario starting with total shots creating an understanding of the entire video conferencing space with all visible objects, after a predefined length of time transitioning to framing a group of objects with medium shots in a sub-location of the video conferencing space focusing on an active object, followed by framing an object who is speaking at the sub-location using medium shots that best display the front of the object's face, after another predefined length of time switching to framing other objects in the video conferencing space using listening shots that best display the front of the object's faces, and rotating back to total shots featuring all objects if no object is speaking in the video conferencing space.

According to various embodiments, the active object comprises an object who is speaking, a whiteboard on which content is being drawn, and an item being held up by an object on demonstration, and the sub-location of the video conferencing space comprises a side of a table, a stage, a bench, a podium, and a row of chairs. In a further embodiment, the meeting room production scenario is further adapted to represent a production scenario selected from the group consisting of a news broadcast or podcast, a bilateral negotiation, a court proceeding, a panel discussion, and a voting assembly.

In another embodiment, the predetermined rule set further comprises a fifth rule for framing clean shots for objects within the virtual conferencing space. The fifth rule comprises not selecting any shot with objects partially visible, and aligning the eyes of an active object at the top one third of a frame. In yet another embodiment, the fifth rule further comprises adding space padding in the direction of an object's gaze, and using a medium shot to frame together active objects that are in proximity. According to various embodiments, the active objects in proximity comprises an object, a whiteboard, a display monitor, a lectern, a podium, and an item on demonstration.

In a further embodiment, the plurality of smart cameras further comprises at least one peripheral smart camera placed in a separate video conferencing space. The predetermined rule set in the main camera is further adapted to create an automated television studio production for a combined virtual conferencing space.

In another embodiment, the autonomous video conferencing system further comprises at least one smart sensor located in the separate video conferencing space. The smart sensor is adapted to capture non-image signals in the separate video conferencing space and provide input to the virtual director unit of the main camera.

In yet another embodiment, the application programming interface of the main camera is adapted to receive input from the user computer thereby modifying the predetermined rule set for the virtual director unit of the main camera.

In accordance with this disclosure, there is provided, in another embodiment, a method for creating an automated television studio production for a video conferencing space with virtual director assistance. The method comprises: capturing video images in the video conferencing space using a plurality of image sensors; capturing audio signals in the video conferencing space using a plurality of audio devices; generating an overview video stream and a focus video stream, wherein the focus video stream comprises sub-video images framing detected objects within the overview video stream; detecting objects and postures from the overview stream and the audio signals by means of machine learning, wherein the objects comprises persons and non-person items and the postures comprises positions, orientations, gestures, and directions of detected objects; implementing a virtual director comprising a predetermined rule set that conforms to television studio production principles; applying the predetermined rule set to the detected objects and postures thereby framing objects of interest and updating the focus video stream in real time; and, outputting the updated focus video stream to a user computer.

In yet another embodiment, the machine learning is performed on at least one hardware accelerated convolutional neural network. In a further embodiment, the neural network is pre-trained with a training set of video and audio data adapted to a special-purpose video conferencing space. In another embodiment, the special-purpose video conferencing space is selected from the group consisting of a classroom, a workshop, a townhall, a newsroom, a boardroom, a courtroom, an interview studio, and a voting chamber.

According to various embodiments, the predetermined rule set comprises a first rule for evaluating possible framing for each object in the video conferencing space based on a first plurality of parameters thereby determining the best frame, a second rule for detecting changes in the video conferencing space based on a second plurality of parameters to trigger transition of frames, a third rule for applying suitable shot types to each frame based on a third plurality of parameters consistent with television studio production principles, a fourth rule for applying virtual Director's Cut based on a fourth plurality of parameters to the video conferencing space thereby tailoring it to special-purpose television production scenarios, and a fifth rule for framing clean shots for objects within the virtual conferencing space based on a fifth plurality of parameters.

In another embodiment, the shot types are selected from the group consisting of a total shot, a medium shot, a close shot, an interest shot, a listening shot, and a presenter shot. In yet another embodiment, the special-purpose television production scenarios comprise a classroom, a workshop, a meeting room, a broadcast, a bilateral negotiation, a court proceeding, a panel discussion, and a voting assembly.

In a further embodiment, the method for creating an automated television studio production further comprises capturing non-image signals in the video conferencing space using a plurality of smart sensors. Each of the plurality of smart sensors comprises an application program interface connected with the virtual director thereby providing input to the virtual director. In various embodiments, each of the plurality of smart sensors is selected from the group consisting of a touchpad, a microphone, a smartphone, a GPS tracker, an echolocation sensor, a thermometer, a humidity sensor, and a biometric sensor.

DETAILED DESCRIPTION OF THE VARIOUS EMBODIMENTS

Video conferencing systems and methods of this disclosure are powered by multiple smart cameras and smart sensors using subsymbolic and symbolic artificial intelligence. In various embodiments, the autonomous video conferencing systems of this disclosure include a plurality of smart cameras optionally coupled with a plurality of smart sensors located in a video conferencing space. Each smart camera is equipped with a vision pipeline supported by machine learning to detect objects and postures and discern speaker-listener dynamics, and a virtual director adapted to apply a predetermined rule set consistent with television studio production principles. Methods are meanwhile provided for creating an automated television studio production for a variety of conferencing spaces and special-purpose scenarios with virtual director assistance.

Pluralities of Smart Cameras & Sensors

Figure 1:
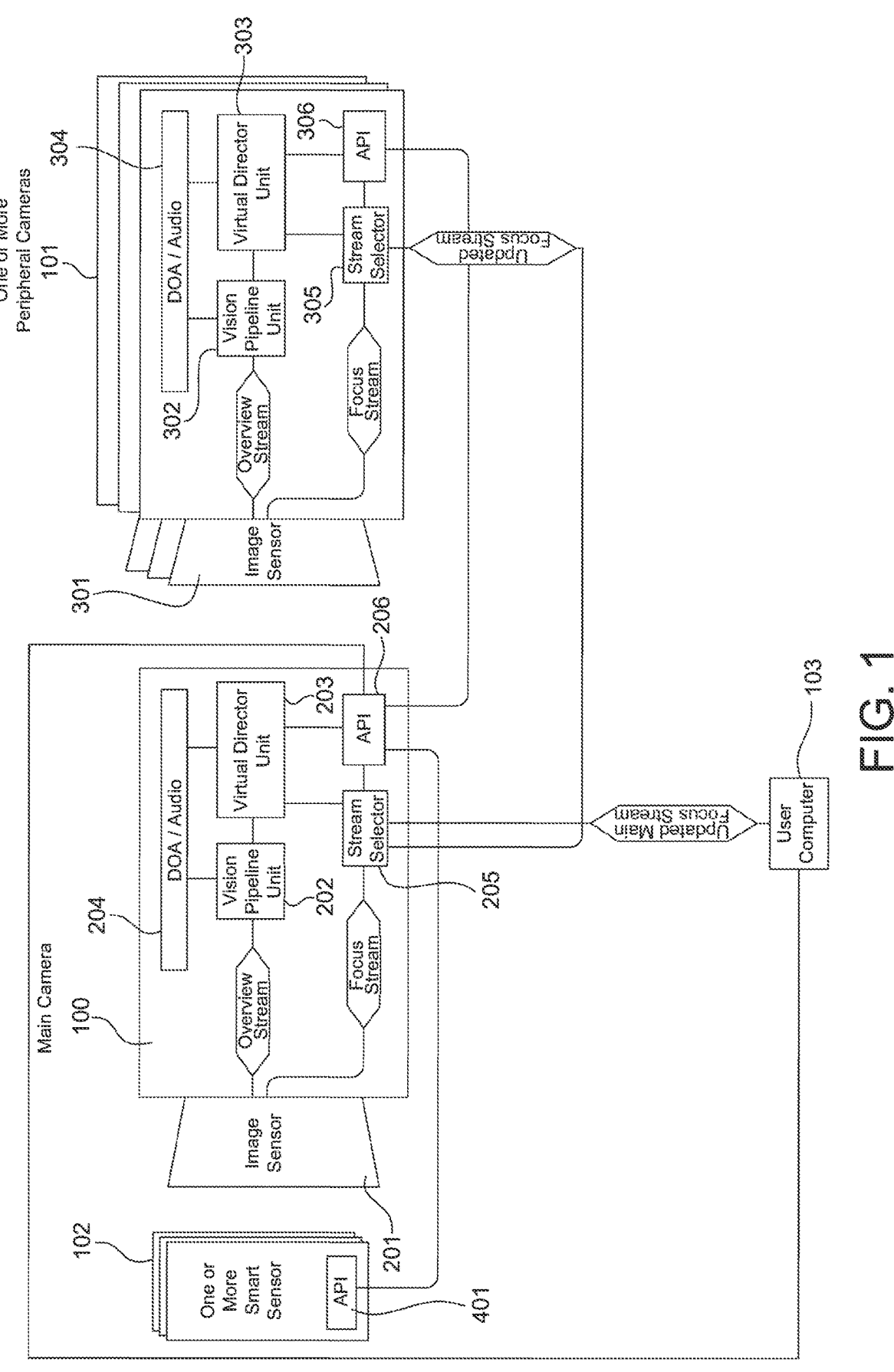
FIG. 1 depicts an autonomous video conferencing system according to one embodiment.

Referring to FIG. 1, the autonomous video conferencing ("AVC") system according to one embodiment comprises a plurality of smart cameras (100, 101) and optionally one or more smart sensors (201). One of the plurality of smart cameras is adapted as the main camera (100) and the remaining of the plurality of smart cameras is adapted as the peripheral cameras (101). Each of the plurality of smart cameras comprises an image sensor (201, 301), an audio device (204, 304), a vision pipeline unit or vision pipeline (202, 302), a virtual director unit or virtual director (203, 303), a stream selector (205, 305), and an application programming interface ("API") (206, 306). The one or more smart sensors each comprises an API (401), capable of connecting to the API of a smart camera. According to one embodiment, the API of the main camera (100) is connected to the API of each peripheral camera (101) and the API of each smart sensor (102). The API of the main camera is further adapted to provide a connection to a user computer (103).

The plurality of smart cameras and one or more smart sensors in the AVC system are connected via Ethernet, other local area networks, or wireless networks in various embodiments. The main cameras and peripheral cameras are variously located in a video conferencing space to provide effective coverage of the video conferencing space according to one embodiment. In another embodiment, a plurality of smart sensors is activated and strategically located in a video conferencing space to capture non-image signals and provide input to the main camera of the AVC system. The smart sensors of this disclosure include touchpads, microphones, smartphones, GPS trackers, echolocation sensors, thermometers, humidity sensors, and biometric sensors in various embodiment.

In alternative embodiments, one or more peripheral cameras and smart sensors of the AVC system are placed in a separate video conferencing space as a secondary space for a video conference. These peripheral cameras and smart sensors are networked with the main camera and adapted to provide image and non-image input from the secondary space to the main camera. The AVC system of these alternative embodiments is thus adapted further to produce an automated television studio production for a combined video conferencing space based on input from all cameras and smart sensors in both spaces.

The smart camera of the AVC system is adapted with different degrees of field of view in various embodiments. Where a video conferencing space is small and the AVC system has a small plurality of cameras, for example, the smart cameras may have a wide field of view, e.g., for approximately 150 degrees. Where a video conferencing space is large and the AVC system has a large plurality of cameras, on the other hand, the smart cameras may have a narrower field of view, e.g., for approximately 90 degrees. The AVC system in another embodiment is equipped with smart cameras with various degrees of field of view, allowing optimal coverage for a video conferencing space. In a further embodiment, the image sensor (201, 301) is adapted to zoom up to 10×, enabling close-up images of objects at the far end of a video conferencing space. In alternative embodiments, one or more smart cameras in the AVC system are adapted to capture content on or about an object that is a non-person item within a video conferencing space, e.g., a whiteboard, a TV display, a poster, and a demonstration bench. These cameras may be smaller and placed differently than the other smart cameras in the AVC system and may be mounted in the ceiling to provide effective coverage of the target content.

In a further embodiment, the audio device (204, 304) in the smart camera is a microphone array adapted to take in audio signals from different locations around the camera. Using signals from different microphones allows the smart camera to determine the direction of audio ("DOA") and discern if there is silence in a location or direction. This information is in turn made available to the vision pipeline (202, 302) and the virtual director (203, 303) of the AVC system. In a further alternative embodiment, a computational device with high computing power is connected to the AVC system through an ethernet switch and adapted to provide additional computing power to the AVC system. It has one or more high performance CPUs and GPUs and runs parts of the vision pipeline for the main camera and any of the designated peripheral cameras.

The inclusion and configuration of multiple smart cameras and smart sensors in the AVC system therefore allows effective and robust coverage of a variety of video conferencing spaces and scenarios. By placing multiple smart cameras in a video conferencing space that collaborate to frame objects in the conference from different camera angles and zoom levels, the AVC system of this disclosure creates a more fulsome, natural, and engaging experience for all participants, including remote users.

Vision Pipeline; Overview & Focus Streams

Figure 2:
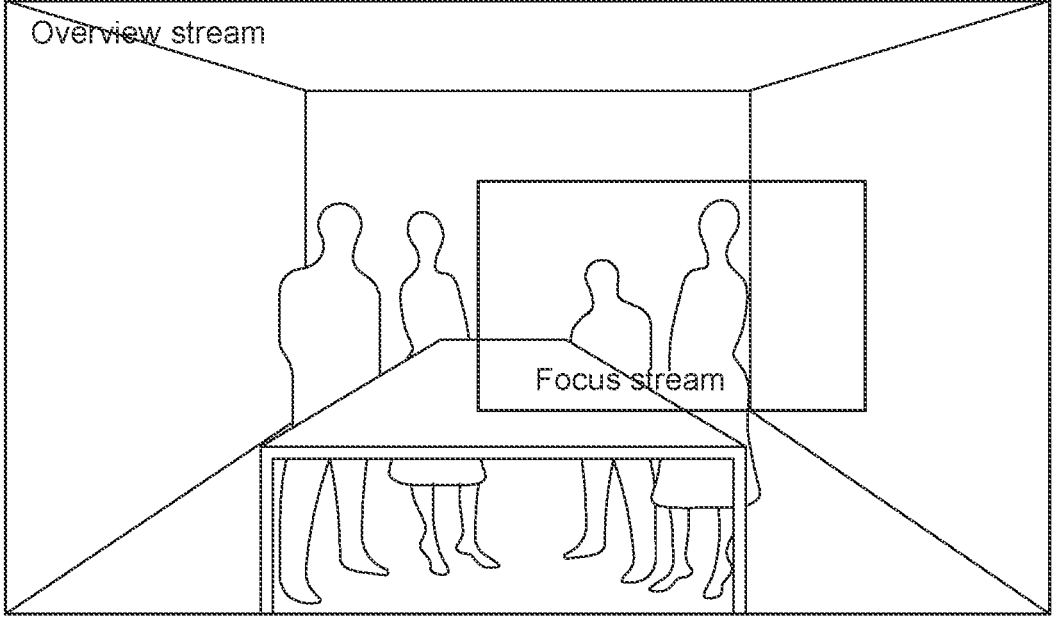
FIG. 2 depicts an overview video stream and a focus video stream according to one embodiment.

Referring to FIG. 2, for each smart camera in the AVC system there are internally two video streams, an overview stream and a focus stream. The overview stream sees the entire scene, which is consumed by the vision pipeline (202, 302) as shown in FIG. 1. The focus stream is a high resolution stream framing objects of interest depending on the activities in a video conferencing space over time. This is where video settings are applied under the direction of the virtual director (203, 303), thereby transitioning the focus stream to an updated focus stream as discussed in detail below.

The vision pipeline of this disclosure is adapted to process the incoming overview stream and audio signals and detect objects and postures by means of machine learning. Objects include persons and non-person items, and postures include positions, orientations, gestures, and directions in various embodiments. The vision pipeline in one embodiment includes one or more hardware accelerated programmable convolutional neural networks, which adopts pretrained weights to allow detection of certain properties of objects in view. For example, the vision pipeline detects where in the view of a smart camera objects are, the extent of their visibility in the view, if they are speaking or not, their facial expressions, their body positions, and their head poses. The vision pipeline also tracks each object over time and determines where an object was previously in the field of view, if they are in motion or not, and in what direction they are heading.

One advantage of the vision pipeline utilizing subsymbolic artificial intelligence to detect objects and their activities and interactions according to various embodiments, is that these convolutional neural networks are trained to not be biased on properties such as gender, age, race, scene, light, and size. This enables the AVC system to create a more accurate and natural video stream production for the entire scene and all objects in a video conferencing space.

The vision pipeline of various embodiments is adapted to run on GPUs or other special purpose chipset with hardware accelerators for relevant mathematical operations in its convolutional neural networks. In an alternative embodiment, the vision pipeline runs on available CPU capacities in the AVC system. Further optimization of the vision pipeline in certain embodiments to fit its hardware chipset is made by replacing mathematical operations in its convolutional neural network architecture with equivalent mathematical operations supported by the chipset. The specialized hardware support of the vision pipeline therefore allows it to perform detections of objects and postures with high frequency and fast processing time, which in turn enables the AVC system to react to changes in the view of its smart cameras promptly and on demand.

In certain embodiments, the vision pipeline is pre-trained by running thousands of images and videos relevant to the scene and the detection objectives for a video conferencing space. During the training, the vision pipeline is evaluated with a loss function that measures how well it performs particular detections. The feedback from the loss function is then used to adjust the weights and parameters of the vision pipeline until it performs the particular detections with a predefined level of satisfaction. In one embodiment, the vision pipeline is further pre-trained and finetuned with a training set of video and audio data adapted to a special-purpose video conferencing space for a special-purpose scenario. For example, the vision pipeline may be finetuned for a classroom, a workshop, a townhall, a newsroom, a boardroom, a courtroom, an interview studio, or a voting chamber to support special-purpose scenarios such as a lecture, an interview, a news broadcast or podcast, a court proceeding, a workshop, a bilateral negotiation, or a voting assembly.

The vision pipeline is further adapted to aggregate and process audio signals from microphones or other audio devices in the AVC system in various embodiments. It is capable of distinguishing voices, including if voices are raised or lowered by objects depending on what is happening in a video conferencing space. In one embodiment, the vision pipeline is adapted to classify the topic of a conversation based on audio signals. Voices that do not belong to an object is classified as artificial sound and may be attributed to other sources such as loudspeakers. The voice classification and characteristics are combined by the vision pipeline with other information and knowledge it detects and gleans from image data for relevant objects and their activities and interactions, thereby generating a comprehensive understanding of the video conferencing space and all detected objects. The vision pipeline makes available this corpus of a comprehensive understanding to the virtual director, which is in turn responsible for selecting best shots and creating an automated television studio production from the video conferencing space.

Virtual Director; Predetermined Rule Set

As discussed above, a virtual director (203, 303) of the AVC system is connected to the vision pipeline (202, 302) and the audio device (204, 304) as shown in FIG. 1, and adapted to frame objects of interest according to a predetermined rule set thereby allowing the focus stream to be updated in real time. The predetermined rule set is developed and implemented for the virtual director consistent with television studio production principles, as discussed in detail below. The transition of the focus stream to an updated focus stream is carried out by the stream selector (205, 305) at the direction the virtual director in each smart camera.

Multiple smart cameras of the AVC system collaborate seamlessly to produce and update the focus streams for various locations and target objects within a video conferencing space. The main camera's virtual director (203) is connected with each peripheral camera's virtual director (303) through their respective APIs (206, 306) as shown in FIG. 1. The main camera's stream selector (205) is connected with each peripheral camera's stream selector (306) and adapted to consume the focus streams from the main camera and all peripheral cameras. The main camera's stream selector (205) is responsible further for selecting, at the direction of the main camera's virtual director (203), one of the updated focus steams from all cameras in the AVC system as the updated main focus stream. This updated main focus stream is the stream output made available to a user computer as shown in FIG. 1. The main camera's virtual director (203) is thus the brain or commend center of the AVC system, and responsible for creating an automated television studio production for the video conferencing space based on input from all cameras and any smart sensors deployed in the AVC system.

The virtual director of this disclosure is a software component utilizing rule-based symbolic artificial intelligence to optimize decision making in various embodiments. The virtual director takes input from the vision pipeline and determines what frame from which camera in the AVC system should be selected and streamed to a user ultimately. In certain embodiments, the virtual director accomplishes this by evaluating possible framing for each object in the video conferencing space and their activities over time. For each object captured by a particular smart camera in the AVC system, for example, the virtual director evaluates different crops of images where the object is visible in order to find the best frame for the object in the context of their activities and interactions. The virtual director then determines video settings suitable for transitioning the particular camera's focus stream to the selected best frame. The transitioning and updating of the focus stream using these video settings is then carried out by the stream selector at the direction the virtual director.

In certain embodiments, the virtual director of the main camera takes input additionally from one or more smart sensors deployed in the AVC system through their respective APIs. The input from smart sensors includes non-image signals or cues in general about the video conferencing space and all objects therein, e.g., objects' locations, movements, and physiological or biometric properties.

The APIs of the AVC system are adapted to transmit messages between various components over an internal network bus. These messages include information regarding the status of each smart camera, e.g., if it is connected, what type of software it is running, current health status etc. The APIs also communicate what a camera detects from image data, e.g., where in the image an object is detected, where in the conferencing space they are placed, and other information detected by the vision pipeline. The APIs in addition communicate video settings that are being applied to the focus stream, e.g., image properties, color, brightness, etc. Further, the APIs are adapted to communicate the virtual director parameters, which allows the AVC system to automatically set and adjust the virtual director rule set and related parameters for all its component cameras as well as allows users of the AVC system to personalize the virtual director experience by modifying certain parameters and rules for its predetermined rule set.

As discussed above, the virtual director of this disclosure employs rule-based decision-making utilizing symbolic artificial intelligence. A predetermined rule set is developed in various embodiments conforming to television studio production principles. This allows the AVC system to produce an automated television studio production of a conference experience that resembles a television production directed by real-world professionals. In a certain embodiment, the predetermined rule set in each camera of the AVC system may be differently adapted for its location and target objects or content within a video conferencing space. In one embodiment, as shown in FIG. 1 the predetermined rule set applied by the virtual director (203) of the main camera includes a larger number of rules than the predetermined rule set applied by a peripheral camera's virtual director (303). In an alternative embodiment, a user is provided with the option to modify or tune certain rules and parameters of the predetermined rule set in an AVC system through the API of the main camera, which is connected to the main camera's virtual director unit (203) as shown in FIG. 1.

According to one embodiment, the predetermined rule set includes a first rule for evaluating possible framing for each object in the video conferencing space based on a first plurality of parameters. The first rule determines the best frame for each object. The first plurality of parameters in one embodiment includes (i) whether the object is speaking; (ii) the length of speaking time; (iii) the direction of the object's gaze; (iv) the extent of the object's visibility in the frame; (v) the posture of the object; and (vi) what other objects are visible in the frame.

The predetermined rule set includes a second rule in another embodiment for detecting changes in the video conferencing space based on a second plurality of parameters. The second rule triggers transition of frames. The second plurality of parameters include in one embodiment: (i) an object starts to speak; (ii) an object moves; (iii) an object stands up; (iv) the direction of an object's gaze changes; (v) an object shows a reaction; (vi) an object displays a new item in the scene; (vii) an object has spoken for a predefined length of time; and (viii) lack of meaningful reactions in the other objects for a predefined length of time.

Figure 3:
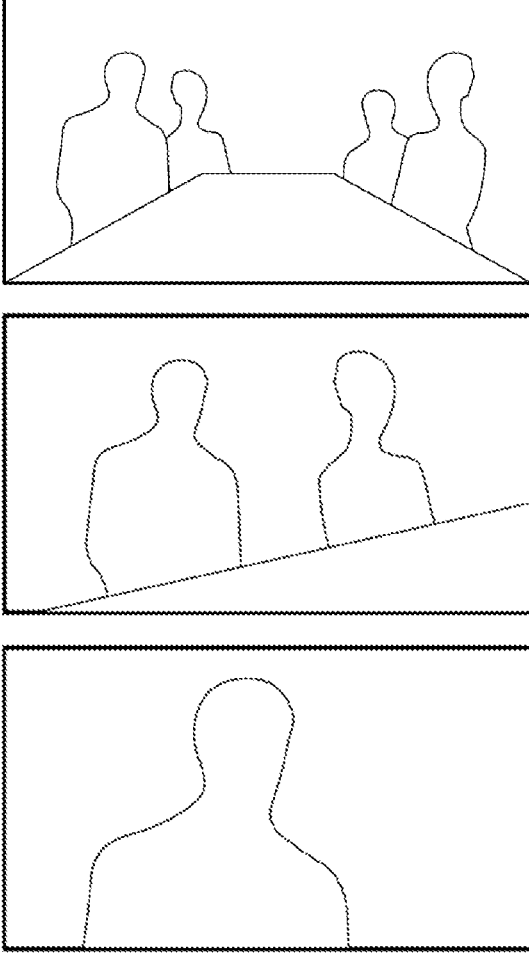
FIG. 3 illustrates a total shot, a medium shot, and a close shot according to one of the rules of the predetermined rule set in one embodiment.

The predetermined rule set includes a third rule in another embodiment for applying suitable shot types to each frame based on a third plurality of parameters. The third plurality of parameters in one embodiment includes: (i) a total shot to frame substantially all objects and most of the video conferencing space thereby providing an overall context to the video conferencing space, see FIG. 3, top frame; (ii) a medium shot to frame a predefined number of objects and focus on one who is speaking, thereby featuring an active dialog, see FIG. 3, middle frame; and (iii) a close shot to frame one object speaking for a predefined length of time, thereby featuring a presenter, see FIG. 3, bottom frame.

The third rule plurality of parameters in another embodiment further includes: (i) an interest shot to frame an object of interest based on cues of the scene in the video conferencing space, including an object at the center of the gaze from every object within the video conferencing space and an item held up by an object; (ii) a listening shot to frame at least one object who is not speaking, thereby featuring engagement of non-speaking objects in the video conferencing space; and (iii) a presenter shot to frame an object who has been speaking for the longest length of time compared to other objects, thereby featuring the presenter from different camera angles and compositions within a video conferencing space. In various embodiments, the interest shot is adapted as a close shot, the listening shot is adapted as a close shot or a medium shot, and the presenter shot is adapted as a close shot or a medium shot.

The predetermined rule set includes a fourth rule in another embodiment for applying virtual Director's Cut based on a fourth plurality of parameters to the video conferencing space. The fourth rule tailors video settings to special-purpose television production scenarios. The fourth plurality of parameters in one embodiment includes a classroom production scenario, a workshop production scenario, and a meeting room production scenario. The meeting room production scenario is further adapted in certain embodiments for a news broadcast or podcast, a bilateral negotiation, a court proceeding, a panel discussion, and a voting assembly.

Figure 4:
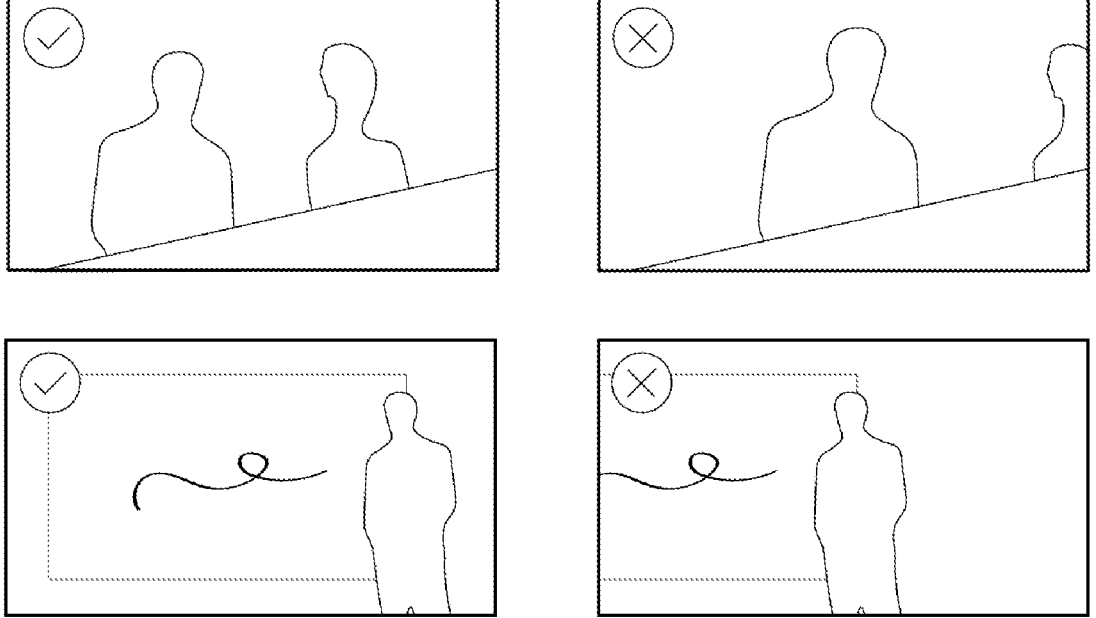
FIG. 4 illustrates framing clean shots according to one of the rules of the predetermined rule set in one embodiment.
Figure 5:
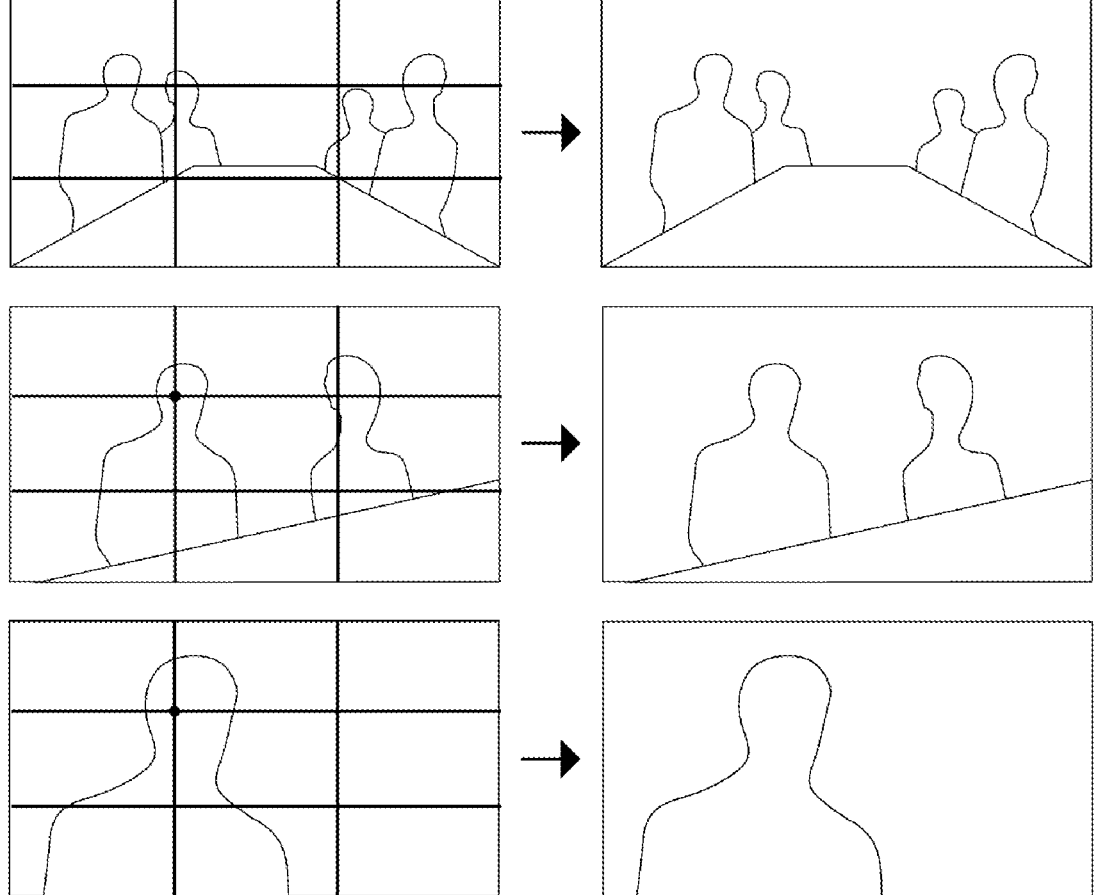
FIG. 5 illustrates alignment for framing clean shots according to one of the rules of the predetermined rule set in one embodiment.

The pre-determined rule set includes a fifth rule in a further embodiment for framing clean shots for objects within the virtual conferencing space. The fifth rule in one embodiment includes not selecting any shot with objects partially visible. Referring to FIG. 4, for example, the left frames are clean shots, and the right frames are not clean shots and not selected in the AVC system under the fifth rule. The fifth rule in another embodiment includes aligning the eyes of an active object at the top one third of a frame. Referring to FIG. 5, for example, each of the images (top, middle, and bottom) is optimally aligned with the eyes of an active object at the top one third of the frame. These shots are clean shots framed and selected in the AVC system under the fifth rule.

The fifth rule in yet another embodiment includes adding space padding in the direction of an object's gaze, and using a medium shot to frame together active objects that are in proximity. The active objects in proximity include an object, a whiteboard, a display monitor, a lectern, a podium, and an item on demonstration in various embodiments.

Special-Purpose Scenarios

The AVC system of this disclosure is adapted for a variety of special-purpose video conferencing spaces for special-purpose video conferencing scenarios in various embodiments. The vision pipeline unit of the smart cameras in the AVC system is pre-trained according to certain embodiments with a training set of video and audio data adapted to a special-purpose video conferencing space, including a classroom, a workshop, a townhall, a newsroom, a boardroom, a courtroom, an interview studio, and a voting chamber.

As discussed above, among the predetermined rule set implemented and applied by the virtual director unit of the AVC system is a fourth rule that makes virtual Director's Cut based on a fourth plurality of parameters. This fourth rule for virtual Director's Cut is designed to tailor a video conferencing space to special-purpose television production scenarios. The fourth plurality of parameters in one embodiment includes a classroom production scenario, a workshop production scenario, and a meeting room production scenario.

A classroom scenario in one embodiment starts with showing a presenter and an audience using total shots, then transitions to framing the presenter in presenter shots for a predefined length of time, thereafter turns to switching between listening shots showing the audience and presenter shots showing the presenter.

A workshop production scenario in one embodiment starts with showing all participating objects using total shots, then transitions to showing an active object using medium shots, thereafter turns to showing an object moving in the video conferencing space using medium shots, and finally rotates back after a predefined length of time to showing active objects within the video conferencing space.

A meeting room production scenario in one embodiment starts with total shots creating an understanding of the entire video conferencing space with all visible objects, after a predefined length of time transitions to framing a group of objects with medium shots in a sub-location of the video conferencing space focusing on an active object, thereafter turns to framing an object who is speaking at the sub-location using medium shots that best display the front of the object's face, after another predefined length of time then switches to framing other objects in the video conferencing space using listening shots that best display the front of the object's faces, and finally rotates back to total shots featuring all objects if no object is speaking in the video conferencing space. An active object in various embodiments represents an object who is speaking, a whiteboard on which content is being drawn, or an item being held up by an object on demonstration. The sub-location of the video conferencing space in various embodiments represents a side of a table, a stage, a bench, a podium, or a row of chairs.

The meeting room production scenario in certain embodiments is further adapted to represent a news broadcast or podcast, an interview, a board meeting, a bilateral negotiation, a court proceeding, a panel discussion, and a voting assembly.

Figure 6:
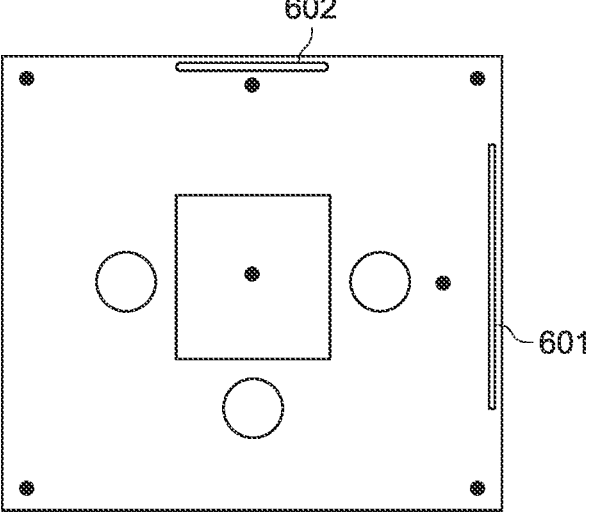
FIG. 6 shows two examples of a small video conferencing space for a special-purpose scenario in which an autonomous video conferencing system is deployed according to one embodiment.
Figure 6:
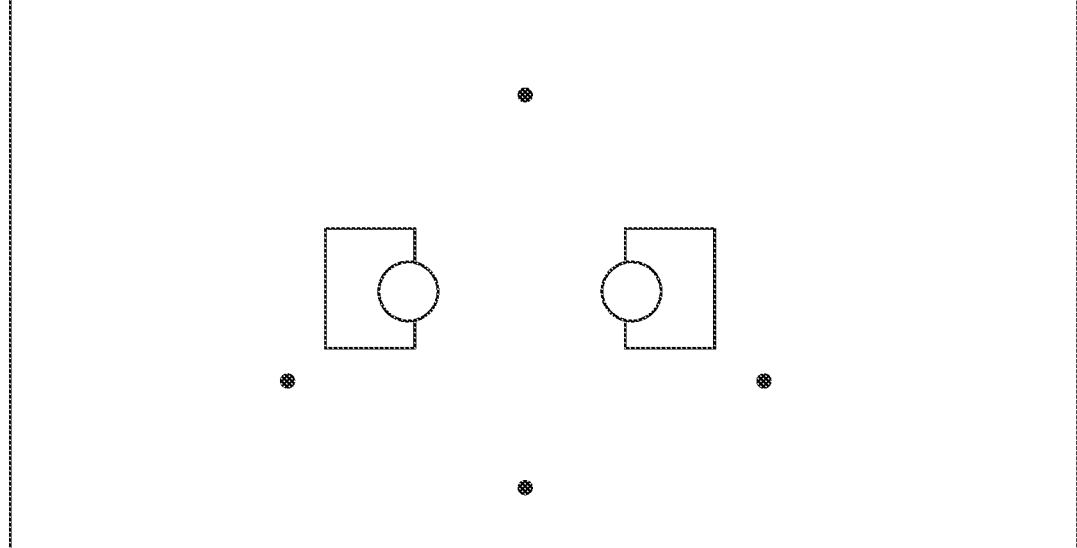
Figure 7:
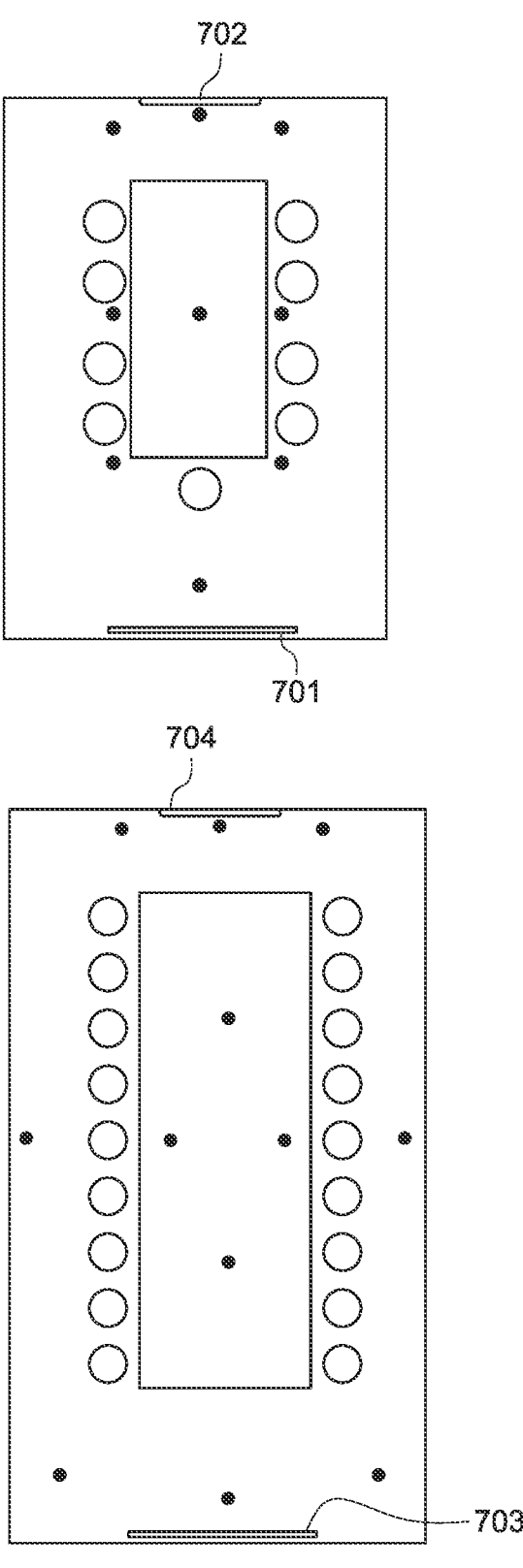
FIG. 7 shows two examples of a medium video conferencing space for a special-purpose scenario in which an autonomous video conferencing system is deployed according to one embodiment.
Figure 8:
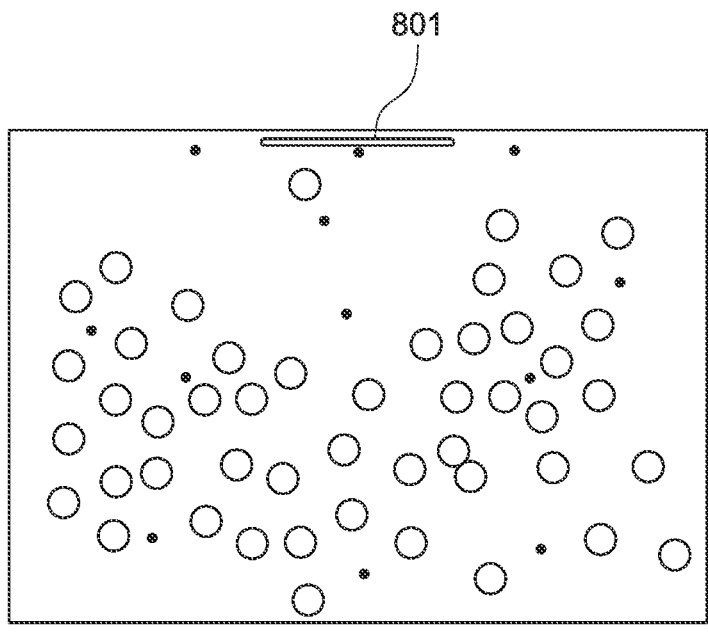
FIG. 8 shows two examples of a large video conferencing space for a special-purpose scenario in which an autonomous video conferencing system is deployed according to one embodiment.
Figure 8:
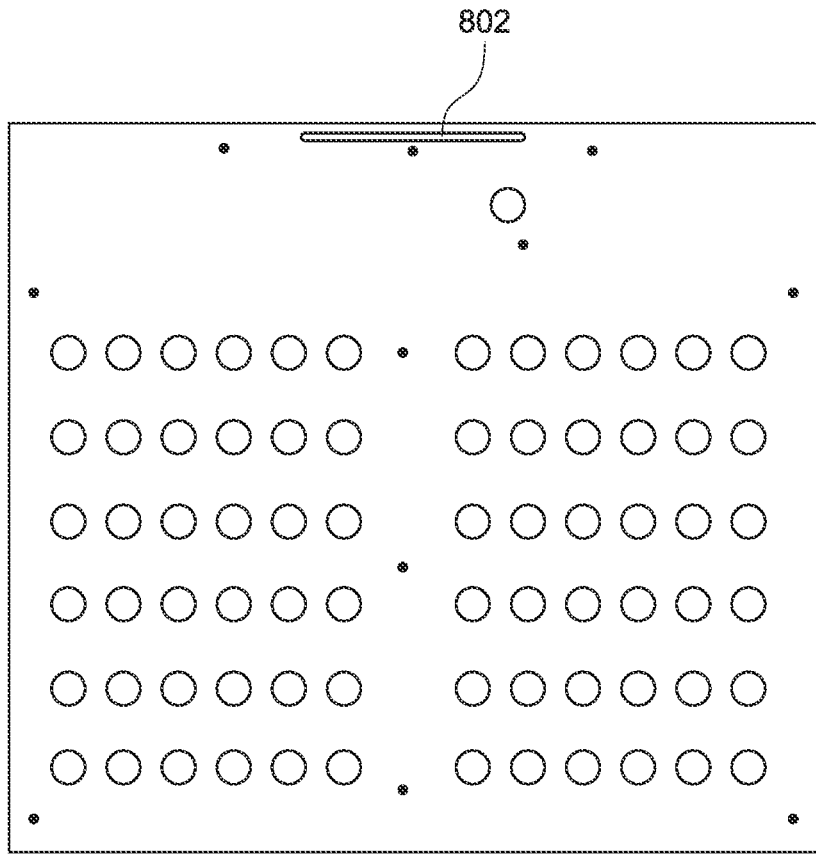

For various special-purpose scenarios, the main camera and the peripheral cameras are strategically and variously placed within the video conferencing space to provide effective coverage of the space. One or more optional smart sensors are additionally dispensed within the video conferencing space with connection to the main camera and provide input to the virtual director unit of the main camera. Examples of AVC systems of this disclosure deployed for special-purpose scenarios are shown in FIGS. 6-8. In these drawings each dot represents a smart camera or a smart sensor of an AVC system and each circle represents an object, including a person or a non-person item such as a chair or a demonstration subject. The small rectangles along the sides of each of these drawings represents a TV, a whiteboard, a poster, or a projection display (601, 602, 701, 702, 703, 704, 801, 802). The square or rectangles in the middle of the drawings represent a table.

Referring to FIG. 6, both the top and bottom depict a small video conferencing space in which an AVC system is deployed. The top configuration represents a small meeting and a panel discussion scenario in one embodiment. The bottom configuration represents a news broadcast or podcast and an interview scenario in one embodiment.

Referring to FIG. 7, both the top and bottom depict a medium video conferencing space in which an AVC system is deployed. The top configuration represents a board meeting scenario in one embodiment. The bottom configuration represents a bilateral negotiation in one embodiment.

Referring to FIG. 8, both the top and bottom depict a large video conferencing space in which an AVC system is deployed. The top configuration represents a workshop scenario in one embodiment. The bottom configuration represents a classroom scenario in one embodiment.

The descriptions of the various embodiments, including the drawings and examples, are to exemplify and not to limit the invention and the various embodiments thereof.

What is claimed is:

1. A multi-camera videoconferencing system, comprising:
two or more cameras, wherein each camera of the multi-camera videoconferencing system is located in different areas of a video conferencing space and includes an image sensor configured to capture an overview video stream; and
at least one video processing unit configured to:
cause an overview video stream from a first camera to be shown on a display during a first time period; and
cause a focus video stream, derived from an overview video stream associated with a second camera, to be shown on the display during a second time period, wherein a transition is applied between the display of the overview video stream from the first camera and the display of the focus video stream;
wherein the focus video stream derived from the overview video stream associated with the second camera features an object that is also represented in the overview video stream of the first camera, and
wherein the first time period, the transition, and the second time period are determined based on a production scenario corresponding to the video conferencing space.

2. The multi-camera videoconferencing system of claim 1, wherein the at least one video processing unit is further configured to cause the transition between the overview video stream from the first camera and the focus video stream.

3. The multi-camera videoconferencing system of claim 2, wherein the transition is triggered by a detection that the object has started to speak.

4. The multi-camera videoconferencing system of claim 2, wherein the transition is triggered by a detection of movement associated with the object.

5. The multi-camera videoconferencing system of claim 2, wherein the transition is triggered by a detection of a change in a gaze direction associated with the object.

6. The multi-camera videoconferencing system of claim 2, wherein the transition is triggered by a detection of a reaction made by the object.

7. The multi-camera videoconferencing system of claim 2, wherein the at least one video processing unit is further configured to cause a secondary transition between the focus video stream and a listener video stream, wherein the listener video stream frames a non-speaking object, and wherein the secondary transition occurs after a predefined length of time.

8. The multi-camera videoconferencing system of claim 7, wherein the predefined length of time is associated with a time duration over which the object featured in the focus video stream is determined to be speaking.

9. The multi-camera videoconferencing system of claim 1, wherein the focus video stream frames a subject determined to be speaking.

10. The multi-camera videoconferencing system of claim 1, wherein the object is a meeting participant.

11. The multi-camera videoconferencing system of claim 1, wherein the focus video stream includes an interest shot, a listening shot, or a presenter shot.

12. The multi-camera videoconferencing system of claim 1, wherein production scenario is a classroom, a workshop, or a meeting room.

13. The multi-camera videoconferencing system of claim 1, wherein the first camera is different from the second camera.

14. The multi-camera videoconferencing system of claim 1, wherein the first camera is the same as the second camera.

15. A multi video conferencing camera system, comprising:
a plurality of image sensors located in different areas of a video conferencing space, wherein at least one of the plurality of image sensors is configured to capture an overview video stream; and
a video processing unit configured to:
receive input from a user indicative of a selection by the user of a video stream mode from among two or more video stream modes, wherein each of the two or more video stream modes is associated with a unique video framing scheme for automatically transitioning from an overview video stream to a focus video stream and for automatically framing the focus video stream, wherein the unique video framing scheme is associated with a production scenario corresponding to the video conferencing space;
generate the focus video stream from the overview video stream in accordance with the user's video stream mode selection; and
in accordance with the user's video stream mode selection, cause the overview video stream to be shown on a display for a first time period and cause the focus video stream to be shown on the display for a second time period following a transition from the overview video stream to the focus video stream, wherein the first time period, transition, and second time period are determined based on the production scenario.

16. The camera system of claim 15, wherein the two or more video stream modes include two or more of a classroom mode, a workshop mode, a meeting room mode, a presentation mode, a courtroom mode, a news broadcast mode, or a panel discussion mode.

17. The camera system of claim 15, wherein the focus video stream includes an interest shot, a listening shot, or a presenter shot.

18. The camera system of claim 15, wherein the selection by the user may include a modification to a rule or at least one parameter associated with a rule.

19. A multi-camera videoconferencing system, comprising:
at least one sensor configured to monitor one or more aspects of a videoconference environment;

two or more cameras located in different areas of the videoconference environment, wherein each camera of the multi-camera videoconferencing system includes an image sensor configured to capture an overview video stream; and at least one video processing unit configured to:

cause an overview video stream from a first camera to be shown on a display during a first time period; and cause a focus video stream, derived from an overview video stream associated with a second camera, to be shown on the display during a second time period, wherein a transition is applied between the display of the overview video stream from the first camera and the display of the focus video stream;

wherein the focus video stream is derived from the overview video stream based on an output of the at least one sensor and based upon a frame transition trigger detected based on analysis of at least one overview video stream of the two or more cameras, and wherein the first time period, the transition, the second time period, and the frame transition trigger are determined based on a production scenario corresponding to the videoconference environment.

20. The multi-camera videoconferencing system of claim 19, wherein the at least one sensor includes one or more of a touchpad, a microphone, a smartphone, a GPS tracker, an echolocation sensor, a thermometer, a humidity sensor, and a biometric sensor.

21. The multi-camera videoconferencing system of claim 19, wherein the at least one sensor and the two or more cameras are connected via one or more of an Ethernet connection, a local area network, or a wireless network.

22. The multi-camera videoconferencing system of claim 19, wherein the at least one video processing unit is further configured to cause the transition between the overview video stream displayed during the first time period and the focus video stream displayed during the second time period.

23. The multi-camera videoconferencing system of claim 22, wherein the transition occurs after the first time period at least equals a predefined length of time.

24. The multi-camera videoconferencing system of claim 19, wherein the focus video stream frames an object detected to be speaking.

25. The multi-camera videoconferencing system of claim 19, wherein the at least one video processing unit is further configured to:

aggregate and process audio signals received from at least one audio device to identify subjects associated with two or more voices; and generate the focus video stream based on detection of one of the two or more voices in the audio signals received from the at least one audio device and a correlation of the identified subjects associated with the two or more voices.

26. The multi-camera videoconferencing system of claim 19, wherein the at least one video processing unit is further configured to:

process audio signals received from at least one audio device;

determine whether a detected voice represented by the audio signals is associated with at least one subject present in the videoconference environment; and generate the focus video stream based at least in part on the detected voice.

27. The multi-camera videoconferencing system of claim 19, wherein the at least one video processing unit is further configured to:

process audio signals received from at least one audio device;

determine whether a detected voice represented by the audio signals is not associated with at least one subject present in the videoconference environment; and forego generation of the focus video stream based on the detected voice where the at least one video processing unit determines that the detected voice represented by the audio signals is not associated with at least one subject present in the videoconference environment.

28. The multi-camera videoconferencing system of claim 27, wherein the at least one audio device includes a microphone array, and the at least one video processing unit is configured to determine a direction of audio (DOA) associated with the detected voice, and wherein the determination of whether the detected voice represented by the audio signals is not associated with at least one subject present in the videoconference environment is based on the DOA associated with the detected voice.

29. The multi-camera videoconferencing system of claim 27, wherein the at least one video processing unit is configured to run one or more trained neural networks.

30. The multi-camera videoconferencing system of claim 19, wherein the first camera is different from the second camera.

31. The multi-camera videoconferencing system of claim 19, wherein the first camera is the same as the second camera.

* * * * *